(12) United States Patent
Egashira et al.

(10) Patent No.: US 12,456,785 B2
(45) Date of Patent: Oct. 28, 2025

(54) BATTERY MODULE

(71) Applicant: SANYO Electric Co., Ltd., Osaka (JP)

(72) Inventors: Takuya Egashira, Hyogo (JP); Hiroshi Takata, Hyogo (JP); Kazuhiro Harazuka, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 773 days.

(21) Appl. No.: 17/295,489

(22) PCT Filed: Sep. 27, 2019

(86) PCT No.: PCT/JP2019/038299
§ 371 (c)(1),
(2) Date: May 20, 2021

(87) PCT Pub. No.: WO2020/110449
PCT Pub. Date: Jun. 4, 2020

(65) Prior Publication Data
US 2022/0006164 A1    Jan. 6, 2022

(30) Foreign Application Priority Data

Nov. 28, 2018   (JP) .................................. 2018-222206

(51) Int. Cl.
*H01M 50/691*   (2021.01)
*H01M 10/613*   (2014.01)
(Continued)

(52) U.S. Cl.
CPC ....... *H01M 50/691* (2021.01); *H01M 10/613* (2015.04); *H01M 10/647* (2015.04);
(Continued)

(58) Field of Classification Search
None
See application file for complete search history.

(56) References Cited

U.S. PATENT DOCUMENTS 9,666,845 B2    5/2017  Hayashida et al.
2015/0140408 A1  5/2015  Hayashida et al.
(Continued)

FOREIGN PATENT DOCUMENTS

| CN | 104364931 A | 2/2015 |
|----|-------------|--------|
| CN | 106601945 A | 4/2017 |
| WO | 2017/057207 | 4/2017 |

OTHER PUBLICATIONS

English Translation of Chinese Search Report dated Sep. 21, 2022, issued in counterpart CN Application No. 201980077772.6.
(Continued)

*Primary Examiner* — Matthew T Martin
*Assistant Examiner* — Ankith R Spirathi
(74) *Attorney, Agent, or Firm* — WHDA, LLP

(57) ABSTRACT

Battery module includes battery stack having a plurality of batteries stacked, each battery having a top surface provided with an output terminal, restraining member that has flat portion extending along side surfaces of the plurality of batteries in stacking direction of batteries and restrains the plurality of batteries, and side separator that has first portion interposed between each battery and flat portion and insulates each battery from flat portion. Each battery is disposed with gap from first portion, the gap being large enough to suppress movement of water due to capillarity.

14 Claims, 6 Drawing Sheets

(51) Int. Cl.
  *H01M 10/647* (2014.01)
  *H01M 10/6554* (2014.01)
  *H01M 10/6556* (2014.01)
  *H01M 50/209* (2021.01)
  *H01M 50/264* (2021.01)
  *H01M 50/271* (2021.01)
  *H01M 50/278* (2021.01)
  *H01M 50/289* (2021.01)
  *H01M 50/296* (2021.01)
  *H01M 50/507* (2021.01)

(52) U.S. Cl.
  CPC ... *H01M 10/6554* (2015.04); *H01M 10/6556* (2015.04); *H01M 50/209* (2021.01); *H01M 50/264* (2021.01); *H01M 50/271* (2021.01); *H01M 50/289* (2021.01); *H01M 50/278* (2021.01); *H01M 50/296* (2021.01); *H01M 50/507* (2021.01)

(56) References Cited

U.S. PATENT DOCUMENTS

| | | |
|---|---|---|
| 2017/0110698 A1 | 4/2017 | Kim et al. |
| 2017/0244079 A1 | 8/2017 | Nishimura et al. |
| 2019/0051871 A1* | 2/2019 | Kakimura ........... H01M 50/296 |

OTHER PUBLICATIONS

International Search Report of PCT application No. PCT/JP2019/038299 dated Nov. 26, 2019.

Office Action dated Jan. 6, 2023, issued in counterpart IN Application No. 202147028337 with English translation. (6 pages).

\* cited by examiner (A)

(B)

BATTERY MODULE

CROSS-REFERENCE TO RELATED APPLICATIONS

This application is a U.S. national stage application of the PCT International Application No. PCT/JP2019/038299 filed on Sep. 27 2019, which claims the benefit of foreign priority of Japanese patent application No. 2018-222206 filed on Nov. 28, 2018, the contents all of which are incorporated herein by reference.

TECHNICAL FIELD

The present invention relates to a battery module.

BACKGROUND ART

For example, known examples of a power source that requires high output voltage, such as for a vehicle, include a battery module in which a plurality of batteries is electrically connected. PTL 1 discloses such a battery module in which batteries in a flat square shape are alternately stacked with spacer members in a thickness direction. Each of the spacer members provided in the battery module includes first portions that are disposed on both sides of each battery in a width and face respective side surfaces of each battery along the width direction, and second portions that are connected to the corresponding first portions and face respective side surfaces of each battery along the thickness direction of a secondary battery. That is, the first portions of each of the spacer members are interposed between batteries adjacent to each other to ensure insulation properties between the batteries. The second portions of each of the spacer members are interposed between the corresponding one of side surfaces of each battery and a bind bar extending in a stacking direction of the batteries and restraining the plurality of batteries, thereby ensuring insulation properties between the batteries and the bind bar.

CITATION LIST

Patent Literature

PTL 1: WO 2017/057207 A1

SUMMARY OF THE INVENTION

Measures are taken against a battery module to prevent each battery from being short-circuited with another battery or a member other than the battery, like the spacer members provided as described above.

Here, conceivable causes of a short circuit include dew condensation water generated on a surface of a battery module in use, and water entering from the outside of the battery module, for example. As a result of intensive research on these short circuits caused by water, the present inventors have recognized that there is room to more reliably prevent these short circuits caused by water to improve reliability of a battery module.

The present invention is made in view of these circumstances, and an object of the present invention is to provide a technique for improving reliability of a battery module.

An aspect of the present invention is a battery module. This battery module includes a battery stack having a plurality of batteries stacked, the plurality of batteries each having a top surface provided with an output terminal, a restraining member that has a flat portion extending along side surfaces of the plurality of batteries in a stacking direction of the batteries and restrains the plurality of batteries, and a side separator that has a first portion interposed between each of the plurality of batteries and the flat portion and insulates each battery from the flat portion, the each of the plurality of batteries being disposed with a gap from the first portion, the gap being large enough to suppress movement of water due to capillarity.

Any combination of the components described above and a conversion of expression of the present invention between methods, devices, systems, and the like are also effective as aspects of the present invention.

According to the present invention, reliability of a battery module can be improved.

DESCRIPTION OF EMBODIMENTS

Figure 1:
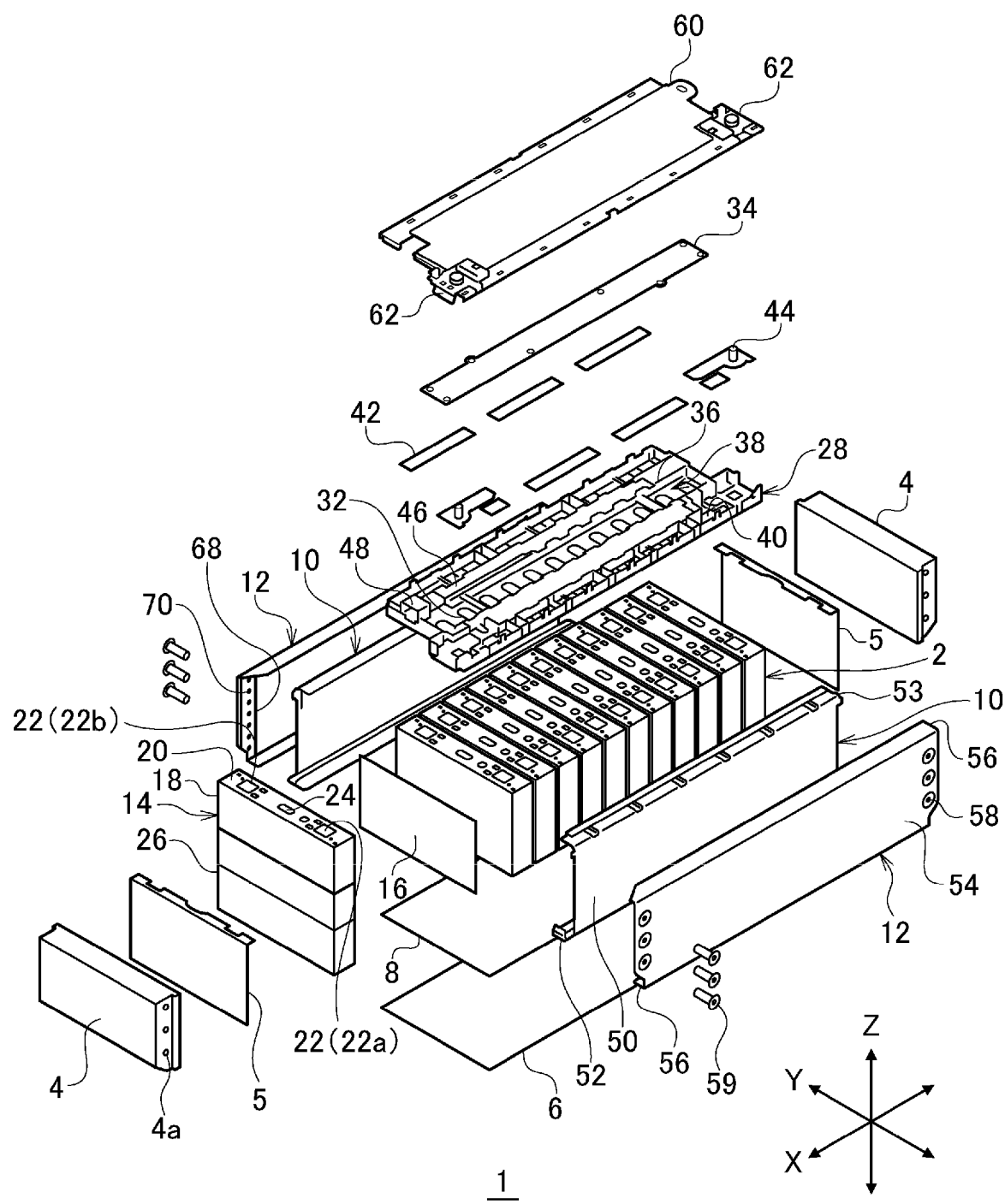
FIG. 1 is an exploded perspective view of a battery module according to a first exemplary embodiment.

Hereinafter, the present invention will be described with reference to the drawings based on preferred exemplary embodiments. The exemplary embodiments do not limit the invention, but are exemplary, and all features and combinations thereof described in the exemplary embodiments are not necessarily essential to the invention. The same or equivalent components, members, and processes illustrated in the drawings are designated by the same reference numerals, and duplicated description will be eliminated as appropriate. Scale and shape of each part illustrated in each drawing are set for convenience to facilitate description, and are not limitedly interpreted unless otherwise specified. When terms such as "first" and "second" are used in the present specification or claims, these terms do not represent any order or importance unless otherwise specified, and are used for distinguishing between a certain structure and another structure. Each drawing illustrates members in which some members that are not important for describing the exemplary embodiment are eliminated.

First Exemplary Embodiment

FIG. 1 is an exploded perspective view of a battery module according to a first exemplary embodiment. Battery module 1 includes battery stack 2, a pair of end plates 4, cooling plate 6, heat conductive layer 8, side separator 10, and restraining member 12.

Battery stack 2 includes a plurality of batteries 14 and inter-cell separators 16. Each battery 14 is a rechargeable secondary battery such as a lithium ion battery, a nickelhydrogen battery, or a nickel-cadmium battery. Battery 14 is a so-called square battery, and has exterior can 18 in a flat rectangular parallelepiped shape. Exterior can 18 has one surface provided with an opening in a substantially rectangular shape (not illustrated), and an electrode body, an electrolytic solution, and the like are housed in exterior can 18 through the opening. Exterior can 18 is provided in the opening with sealing plate 20 for sealing exterior can 18.

Sealing plate 20 is provided with output terminal 22 of a positive electrode near its one longitudinal end and output terminal 22 of a negative electrode near the other longitudinal end. The pair of output terminals 22 are electrically connected to the corresponding one of a positive electrode plate and a negative electrode plate, constituting the electrode body. Hereinafter, output terminal 22 of the positive electrode will be referred to as positive electrode terminal 22*a*, and output terminal 22 of the negative electrode will be referred to as negative electrode terminal 22*b*, as appropriate. When the polarity of output terminals 22 is not required to be distinguished, positive electrode terminal 22*a* and negative electrode terminal 22*b* are collectively referred to as output terminal 22. Exterior can 18, sealing plate 20, and output terminal 22 are electric conductors, and are made of metal, for example. Sealing plate 20 and the opening of exterior can 18 are joined by welding or the like. Each output terminal 22 is inserted into a through-hole (not illustrated) formed in sealing plate 20. An insulating sealing member (not illustrated) is interposed between each output terminal 22 and the corresponding one of the through holes.

In the present exemplary embodiment, each battery 14 is disposed with output terminal 22 facing vertically upward. Thus, each battery 14 has output terminal 22 on its top surface. Each battery 14 has a bottom surface facing the top surface and two main surfaces connecting the top surface and the bottom surface. The main surfaces each have a largest area among six surfaces of battery 14. The main surfaces are each a long side surface connected to long sides of the top surface and the bottom surface. Remaining two surfaces, excluding the top surface, bottom surface and two main surfaces, are side surfaces of battery 14. The side surfaces are each a short side surface connected to short sides of the top surface and the bottom surface. Battery stack 2 has a top surface formed of top surfaces of batteries 14, a bottom surface formed of bottom surfaces of batteries 14, and side surfaces formed of respective short-side surfaces sides of batteries 14.

Sealing plate 20 is provided with valve portion 24 between the pair of output terminals 22. Valve portion 24 is also called a safety valve and is a mechanism for discharging gas inside battery 14. Valve portion 24 is configured to be able to open when internal pressure of exterior can 18 rises above a predetermined value and release the gas inside. Valve portion 24, for example, includes a thin-walled portion that is provided in a part of sealing plate 20 and thinner than other portions thereof, and a linear groove formed in a surface of the thin-walled portion. This structure causes the thin-walled portion to be torn from the groove and opened when the internal pressure of exterior can 18 rises. Valve portion 24 of each battery 14 is connected to exhaust duct 38 described later, and the gas inside the battery is discharged from valve portion 24 to exhaust duct 38.

Battery 14 also has insulating film 26. Insulating film 26 is, for example, a tubular shrink tube, and is heated after exterior can 18 is caused to pass through the inside of insulating film 26. This causes insulating film 26 to shrink and cover two main surfaces and two sides of exterior can 18.

Insulating film 26 can suppress a short circuit between batteries 14 adjacent to each other or between battery 14 and end plate 4. Examples of material constituting insulating film 26 include polyethylene terephthalate (PET) and the like.

The plurality of batteries 14 are stacked at predetermined intervals such that the main surfaces of batteries 14 adjacent to each other face each other. The term, "stacking" means arranging a plurality of members in any one direction. Thus, stacking of batteries 14 also includes arranging a plurality of batteries 14 horizontally. Two batteries 14 adjacent to each other are stacked such that positive electrode terminal 22*a* of one battery 14 and negative electrode terminal 22*b* of another battery 14 are adjacent to each other.

Each inter-cell separator 16 is also called an insulating spacer, and is made of, for example, a resin sheet with insulation properties. Examples of the resin constituting each inter-cell separator 16 include thermoplastic resins such as polypropylene (PP), polybutylene terephthalate (PBT), polycarbonate (PC), and Noryl (registered trademark) resin (modified polyphenylether (PPE)). Each inter-cell separator 16 is disposed between two batteries 14 adjacent to each other to electrically insulate two batteries 14 from each other.

Battery stack 2 is sandwiched between the pair of end plates 4. The pair of end plates 4 is disposed at respective opposite ends of battery stack 2 in stacking direction X of batteries 14. The pair of end plates 4 are adjacent to batteries 14 located at respective opposite ends in stacking direction X with respective outer end separators 5 interposed between the end plates and the corresponding batteries. Outer end separators 5 can be made of the same resin material as inter-cell separators 16. Each end plate 4 is a metal plate made of a metal such as iron, stainless steel, or aluminum. When outer end separator 5 is interposed between end plate 4 and battery 14, both are insulated.

Each end plate 4 has fastening hole 4*a* in two surfaces facing direction Y orthogonal to stacking direction X of batteries 14, i.e., a direction in which the pair of output terminals 22 are arranged. In the present exemplary embodiment, three fastening holes 4*a* are disposed at predetermined intervals in arrangement direction Z of battery stack 2 and cooling plate 6. Fastening holes 4*a* are provided in a surface facing flat portion 54 of restraining member 12.

Battery stack 2 has a top surface on which bus bar plate 28 is placed. Bus bar plate 28 is a plate-shaped member for covering surfaces provided with output terminals 22 of the plurality of batteries 14. Bus bar plate 28 has a plurality of openings 32 at positions corresponding to valve portions 24 of respective batteries 14 to expose corresponding valve portions 24. Bus bar plate 28 includes duct top plate 34 for covering openings 32 from above, and side wall 36 that surrounds sides of openings 32. When duct top plate 34 is fixed to an upper end of side wall 36, exhaust duct 38 is formed in bus bar plate 28. Each valve portion 24 communicates with exhaust duct 38 through the corresponding one of openings 32.

Bus bar plate 28 also has openings 40 at positions corresponding to output terminals 22 of battery 14 to expose corresponding output terminals 22. In each opening 40, bus bar 42 is placed. The plurality of bus bars 42 is supported by bus bar plate 28. Bus bar 42 placed in each opening 40 electrically connects positive electrode terminal 22*a* of one of adjacent batteries 14 and negative electrode terminal 22*b* of the other one of adjacent batteries 14.

Bus bar 42 is a substantially strip-shaped member made of a metal such as copper or aluminum. Bus bar 42 is connected at one end to positive electrode terminal 22a of one battery 14, and at the other end to negative electrode terminal 22b of another battery 14. Bus bar 42 may form a battery block by connecting output terminals 22 having the same polarity in respective adjacent batteries 14 to each other in parallel, and may further connect battery blocks to each other in series.

Bus bar 42 connected to one of output terminals 22 of batteries 14 located at respective opposite ends in stacking direction X has external connection terminal 44. External connection terminal 44 is electrically connected to terminal portion 62 of top cover 60 described later. External connection terminal 44 is connected to an external load (not illustrated) through terminal portion 62. Bus bar plate 28 includes voltage detection line 46 placed thereon. Voltage detection line 46 is electrically connected to a plurality of batteries 14 to detect voltage of each battery 14. Voltage detection line 46 has a plurality of conductor wires (not illustrated). Each of the conductor wires is connected at one end to the corresponding one of bus bars 42, and at the other end to connector 48. Connector 48 is connected to an external battery electronic control unit (ECU) (not illustrated) or the like. The Battery ECU controls detection of, for example, voltage of each battery 14 and charging and discharging of each battery 14.

Cooling plate 6 is made of a material having high thermal conductivity such as aluminum. Cooling plate 6 is thermally connected to battery stack 2, or is connected to battery stack 2 in a thermally exchangeable manner to cool each battery 14. In the present exemplary embodiment, battery stack 2 is placed on a main surface of cooling plate 6. Battery stack 2 is placed on cooling plate 6 such that its bottom surface faces cooling plate 6. Cooling plate 6 may be provided inside with a flow path through which a refrigerant such as water or ethylene glycol flows. This enables cooling efficiency of batteries 14 to be further improved.

Between battery stack 2 and cooling plate 6, heat conductive layer 8 with insulation properties is interposed. That is, cooling plate 6 is thermally connected to battery stack 2 through heat conductive layer 8. Heat conductive layer 8 of the present exemplary embodiment is provided covering the entire bottom surface of battery stack 2. Heat conductive layer 8 has a thermal conductivity higher than the thermal conductivity of air. Heat conductive layer 8 can be made of a known resin sheet having good thermal conductivity, such as an acrylic rubber sheet or a silicone rubber sheet.

When heat conductive layer 8 is interposed between battery stack 2 and cooling plate 6, cooling efficiency of each battery 14 can be improved, and each battery 14 can be cooled more uniformly. When heat conductive layer 8 has insulation properties, battery stack 2 and cooling plate 6 can be prevented from being electrically connected to each other through heat conductive layer 8. Heat conductive layer 8 enables suppressing displacement between battery stack 2 and cooling plate 6 in directions perpendicular to arrangement direction Z of battery stack 2 and cooling plate 6 (i.e., extending directions of an XY plane).

Side separator 10 is an elongated member long in stacking direction X of batteries 14. In the present exemplary embodiment, a pair of side separators 10 are arranged in direction Y orthogonal to stacking direction X of batteries 14. Each side separator 10 is made of, for example, a resin with insulation properties. As with inter-cell separators 16, examples of the resin constituting side separator 10 include thermoplastic resins such as polypropylene (PP), polybutylene terephthalate (PBT), polycarbonate (PC), and Noryl (registered trademark) resin (modified PPE).

Between the pair of side separators 10, battery stack 2, the pair of end plates 4, cooling plate 6, and heat conductive layer 8 are disposed. Each side separator 10 includes first portion 50, second portion 52, and third portion 53. First portion 50 has a rectangular shape and extends in stacking direction X of batteries 14 along a side surface of each battery 14, i.e., a side surface of battery stack 2. Second portion 52 has a strip shape extending in stacking direction X, and projects from a lower side of first portion 50 toward battery stack 2. Third portion 53 has a strip shape extending in stacking direction X, and projects from an upper side of first portion 50 toward battery stack 2.

Restraining member 12 is also called a bind bar, and is an elongated member long in stacking direction X of batteries 14. In the present exemplary embodiment, a pair of restraining members 12 are arranged in direction Y orthogonal to stacking direction X of batteries 14. Each restraining member 12 is made of a metal such as iron or stainless steel. Between the pair of restraining members 12, battery stack 2, the pair of end plates 4, cooling plate 6, heat conductive layer 8, and the pair of side separators 10 are disposed.

Each restraining member 12 includes flat portion 54 and a pair of arm portions 56. Flat portion 54 has a rectangular shape and extends in stacking direction X of batteries 14 along the side surface of each battery 14, i.e., the side surface of battery stack 2. The pair of arm portions 56 project from respective ends of flat portion 54 toward battery stack 2, and face each other in arrangement direction Z of battery stack 2 and cooling plate 6. Specifically, one arm portion 56 projects from an upper side of flat portion 54 toward battery stack 2, and another arm portion 56 projects from a lower side of flat portion 54 toward battery stack 2. Between the pair of arm portions 56, battery stack 2, cooling plate 6, heat conductive layer 8, and the pair of side separators 10 are disposed.

Flat portion 54 has a region to which contact plate 68 is fixed by welding or the like, the region facing the corresponding one of end plates 4. Contact plate 68 is a member long in arrangement direction Z. Contact plate 68 is provided with through-holes 70 at positions corresponding to fastening holes 4a of end plate 4, through-holes 70 passing through contact plate 68 in direction Y. Flat portion 54 is provided with through-holes 58 at positions corresponding to through-holes 70 of contact plate 68, through-holes 58 passing through flat portion 54 in direction Y.

When the pair of end plates 4 are engaged with flat portions 54 of respective restraining members 12, the plurality of batteries 14 is restrained in stacking direction X. Specifically, the plurality of batteries 14 and the plurality of inter-cell separators 16 are alternately arranged to form battery stack 2, and battery stack 2 is sandwiched in direction X between the pair of end plates 4 with respective outer end separators 5 interposed between battery stack 2 and corresponding end plates 4. Heat conductive layer 8 is disposed on the bottom surface of battery stack 2, and cooling plate 6 is disposed facing battery stack 2 with heat conductive layer 8 interposed therebetween. In this state, battery stack 2, the pair of end plates 4, cooling plate 6, and heat conductive layer 8 are sandwiched in direction Y by the pair of side separators 10. Then, the pair of restraining members 12 sandwich the whole in direction Y from outside the corresponding pair of side separators 10.

The pair of end plates 4 and the pair of restraining members 12 are aligned with each other such that corresponding fastening holes 4a, through-holes 70, and through-holes 58 overlap each other. Then, fastening members 59 such as screws are inserted into corresponding through-holes 58 and through-holes 70, and are screwed into corresponding fastening holes 4a. This causes the pair of end plates 4 and the pair of restraining members 12 to be fixed. When the pair of end plates 4 are engaged with the corresponding pair of restraining members 12, the plurality of batteries 14 are tightened and restrained in stacking direction X. This causes each battery 14 to be positioned in stacking direction X. Additionally, top surfaces and bottom surfaces of the plurality of batteries 14 are sandwiched between two arm portions 56 facing each other in arrangement direction Z. This causes the plurality of batteries 14 to be positioned in arrangement direction Z.

As an example, after the positioning described above is completed, bus bar plate 28 is placed on battery stack 2. Then, bus bars 42 are attached to corresponding output terminals 22 of respective batteries 14, and output terminals 22 of respective batteries 14 are electrically connected to each other. For example, bus bars 42 are fixed to corresponding output terminals 22 by welding.

Bus bar plate 28 has a top surface on which top cover 60 is stacked. Top cover 60 prevents dew condensation water, dust, and the like from coming into contact with output terminals 22 and valve portions 24 of batteries 14, bus bars 42, and the like. Top cover 60 is made of, for example, a resin with insulation properties. Top cover 60 includes terminal portion 62 at a position overlapping external connection terminal 44 in arrangement direction Z. Top cover 60 is fixed to bus bar plate 28 by snap-fit, for example. In a state where top cover 60 is placed on bus bar plate 28, external connection terminal 44 and terminal portion 62 are connected.

Figure 2:
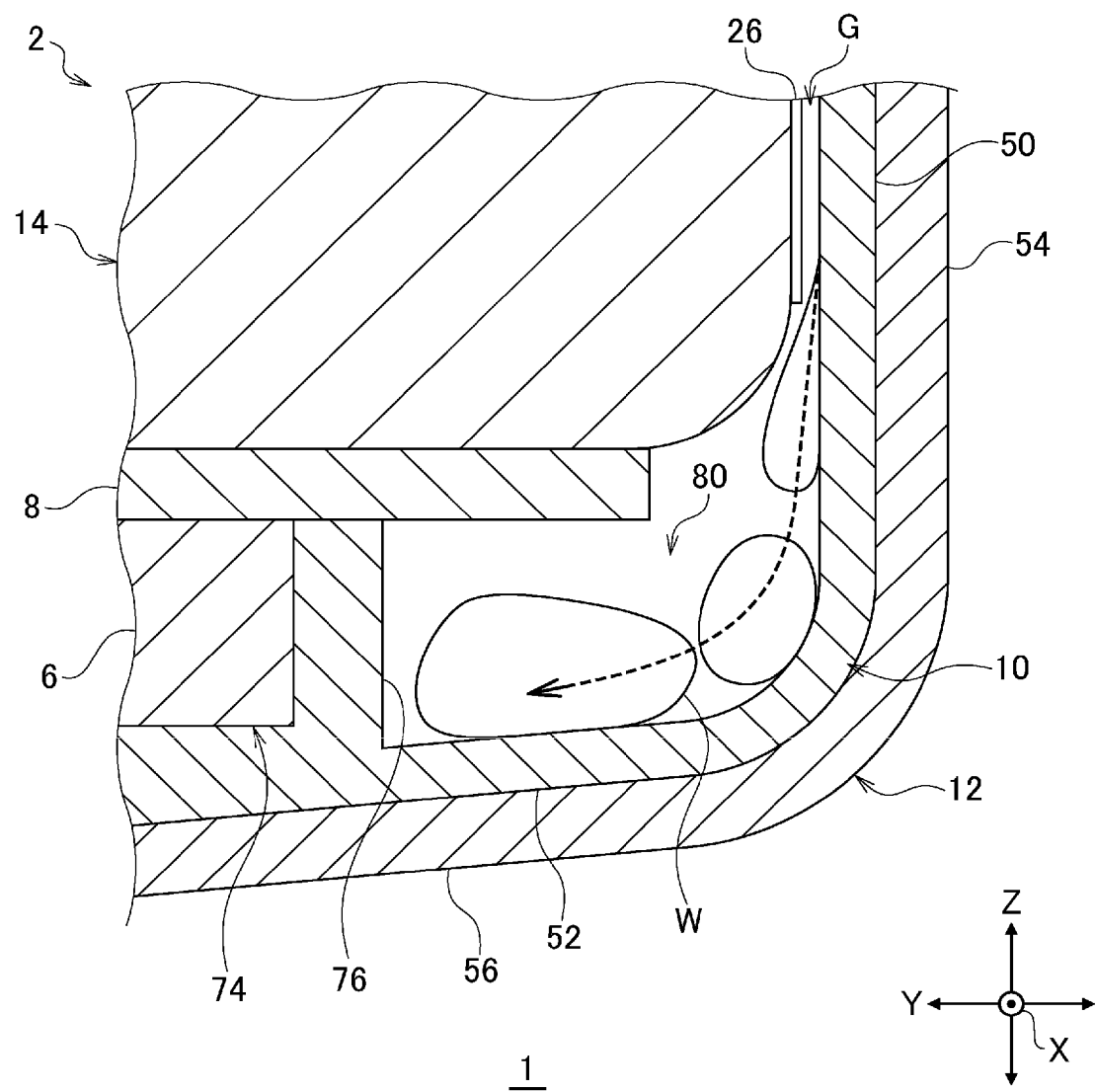
FIG. 2 is a sectional view illustrating a bottom of the battery module in an enlarged manner.
Figure 3:
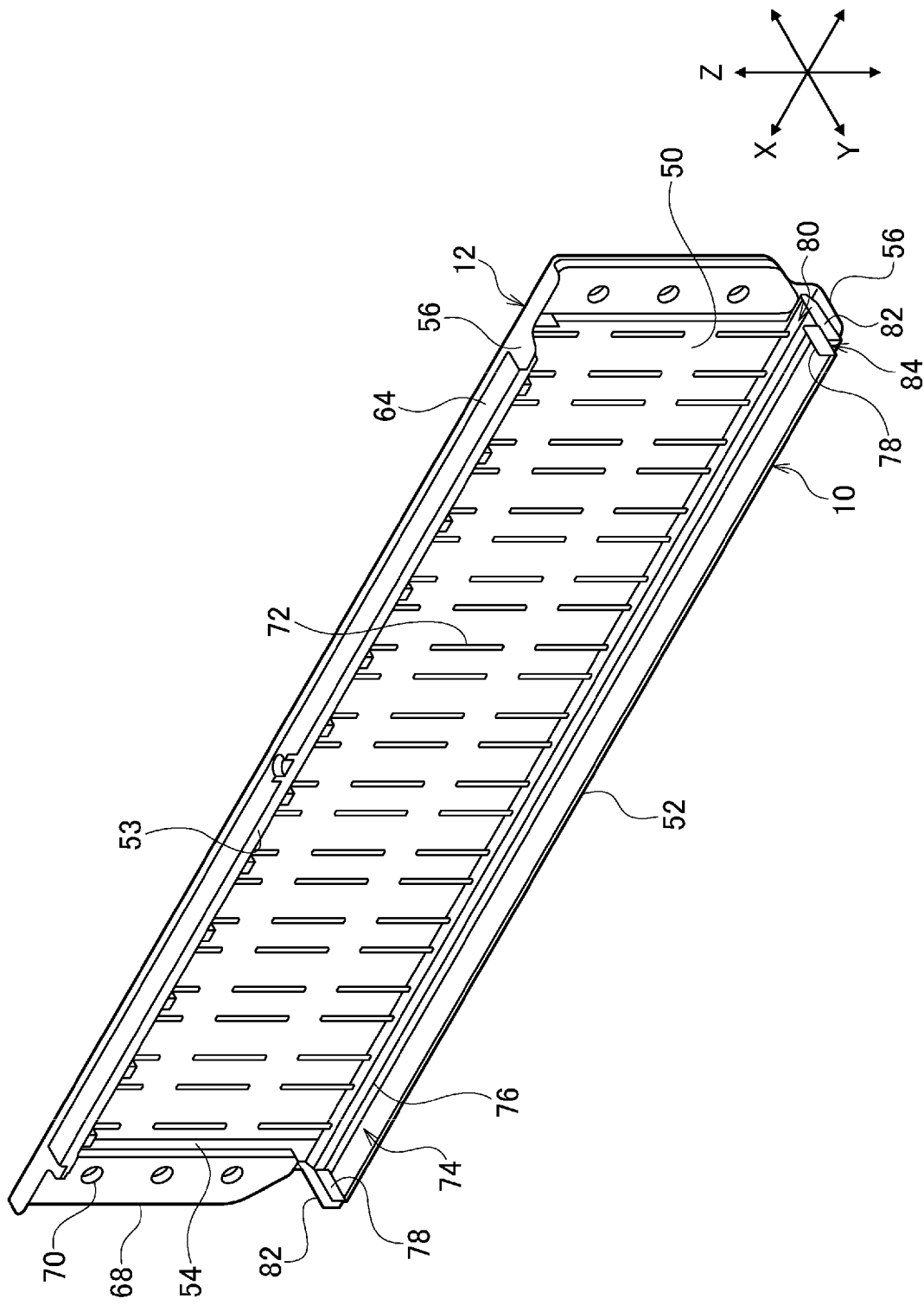
FIG. 3 is a perspective view of a side separator and a restraining member.

FIG. 2 is a sectional view illustrating a bottom of the battery module in an enlarged manner. FIG. 3 is a perspective view of the side separator and the restraining member. In FIG. 2, illustration of an internal structure of battery 14 is omitted.

Restraining members 12 of the present exemplary embodiment sandwich the plurality of batteries 14 in stacking direction X of batteries 14, and sandwich battery stack 2 and cooling plate 6 in arrangement direction Z thereof. Specifically, restraining members 12 sandwich the plurality of batteries 14 in stacking direction X when opposite ends of flat portions 54 in stacking direction X of batteries 14 are engaged with the corresponding pair of end plates 4 (refer to FIGS. 1 and 2). Each of restraining members 12 also sandwiches battery stack 2, heat conductive layer 8, and cooling plate 6 with the pair of arm portions 56 in arrangement direction Z. That is, restraining members 12 have not only a function of fastening the plurality of batteries 14 but also a function of fastening battery stack 2 and cooling plate 6. Thus, unlike conventional structures, battery stack 2 and cooling plate 6 are not fastened with screws.

First portion 50 of side separator 10 extends along the corresponding one of side surfaces of battery stack 2 in stacking direction X of batteries 14. Flat portion 54 of restraining member 12 extends in stacking direction X of batteries 14 along the corresponding one of the side surfaces of battery stack 2 outside first portion 50. Thus, first portion 50 of side separator 10 is interposed between the corresponding one of the side surfaces of each battery 14 and flat portion 54 of restraining member 12. This causes the corresponding one of the side surfaces of each battery 14 and flat portion 54 of restraining member 12 to be electrically insulated.

Second portion 52 of side separator 10 is in contact with a lower side of cooling plate 6, i.e., a main surface opposite to battery stack 2. Arm portion 56 protruding from the lower end of flat portion 54 of restraining member 12 extends outside second portion 52 along the lower main surface of cooling plate 6. Thus, second portion 52 of side separator 10 is interposed between cooling plate 6 and one arm portion 56 of restraining member 12, i.e., arm portion 56 on a lower side. This causes cooling plate 6 and restraining member 12 to be electrically insulated from each other.

Third portion 53 of side separator 10 is in contact with on the top surface of battery stack 2. Arm portion 56 protruding from an upper end of flat portion 54 of restraining member 12 extends outside third portion 53 along the top surface of battery stack 2. Thus, third portion 53 of side separator 10 is interposed between the top surface of battery stack 2 and another arm portion 56 of restraining member 12, i.e., arm portion 56 on an upper side. This causes the top surface of each battery 14 and restraining member 12 to be electrically insulated.

In a state where battery stack 2, heat conductive layer 8, and cooling plate 6 are sandwiched by the pair of arm portions 56 in arrangement direction Z, heat conductive layer 8 is pressed by battery stack 2 and cooling plate 6 to be elastically or plastically deformed. This enables a thermal connection between battery stack 2 and cooling plate 6 to be obtained more reliably. This also enables entire battery stack 2 to be cooled uniformly.

Third portion 53 of side separator 10 includes folded portion 64. Folded portion 64 extends from a leading end of third portion 53, projecting toward battery stack 2, toward outside battery module 1 in direction Y. Between third portion 53 and folded portion 64 in arrangement direction Z, a predetermined space is provided, and arm portion 56 on the upper side of restraining member 12 is inserted into the space between third portion 53 and folded portion 64. Thus, a leading end of arm portion 56 on the upper side is wrapped with side separator 10.

Each battery 14 and first portion 50 are disposed with gap G having a size for suppressing movement of water W due to capillarity. Gap G is a distance between the corresponding one of the side surfaces of each battery 14 and first portion 50 in direction Y. Water W generated on the top surface of battery 14 due to dew condensation or the like flows down toward the bottom surface of battery 14 through gap G between battery 14 and first portion 50 due to gravity. Water W having flowed toward the bottom surface of battery 14 may adhere to arm portion 56 of restraining member 12 on the lower side, cooling plate 6, or the like.

When gap G between the corresponding one of the side surfaces of each battery 14 and first portion 50 is large enough to cause movement of water W due to the capillarity, water W having flowed down toward the bottom surface of battery 14 may extend and spread upward inside gap G due to the capillarity. In this case, a conductive path through water W is formed between the top surface of battery 14, and a portion of restraining member 12, close to the bottom surface of battery 14 (hereinafter referred to as a bottom of restraining member 12) or cooling plate 6, so that these components may be short-circuited. The present inventors have first discovered a mechanism of this short circuit after extensive research.

In contrast, when gap G between each battery 14 and first portion 50 is set to a size for suppressing movement of water W due to the capillarity, the above-mentioned short circuit among battery 14, restraining member 12, and cooling plate 6 can be prevented. The size for suppressing movement of water W due to the capillarity can be set based on a balance between force for pulling up water W due to the capillarity and force for dropping water W due to its own weight. The force for pulling up water W due to the capillarity includes force for pulling up water W along a surface of first portion 50 and force for pulling up water W along the corresponding one of the side surfaces of battery 14.

That is, gap G can be set based on, for example, Expression (1) below.

$$L\gamma \cos \theta_A + L\gamma \cos \theta_B < GLh\rho g \tag{1}$$

In Expression (1), each symbol is as follows:
G [unit: m] is a size of a gap between battery 14 and first portion 50;
L [unit: m] is a length of water W (water mass) existing gap G in stacking direction X;
h [unit: m] is a height of water W existing in gap G;
γ [unit: N/m] is a surface tension coefficient;
$\theta_A$ [unit: °] is a contact angle between a surface of first portion 50 and water W;
$\theta_B$ [unit: °] is a contact angle between the corresponding one of side surfaces of battery 14 and water W;
ρ [unit: kg/m³] is density of water W; and
g [unit: m/s²] is gravitational acceleration.

Gap G has a size corresponding to a width of water W existing in gap G.

As an example, it is assumed that material of side separator 10 is polypropylene (PP), and material of the side surfaces of battery 14, i.e., material of insulating film 26 is polyethylene terephthalate (PET). It is also assumed as follows: length L of battery 14 in stacking direction X is 0.0265 m; height h of water W existing in gap G is 0.0031 m; surface tension coefficient γ is 0.07275 N/m; contact angle $\theta_A$ between the surface of first portion 50 and water W is 94°; contact angle $\theta_B$ between a side surface of battery 14 and water W is 79°; density ρ of water W at a temperature of 20° C. is 998.233 kg/m³; and gravity acceleration g is 9.80665 m/s².

In this case, when Expression (1) is transformed into an expression for gap G and each numerical value is substituted, the following is acquired:

$$L\gamma \cos \theta_A + L\gamma \cos \theta_B < GLh\rho g;$$

$$\gamma(\cos \theta_A + \cos \theta_B) < Gh\rho g;$$

$$\gamma(\cos \theta_A + \cos \theta_B)/h\rho g < G;$$

0.07275(cos 94°+)cos 79°/(0.0031×998.233×9.80665) <G; and
0.29 [mm]<G

This example shows that when gap G is set to more than 0.29 mm, water W can be prevented from being pulled up toward the top surface of battery 14 due to the capillarity in gap G between battery 14 and first portion 50.

Side separator 10 of the present exemplary embodiment includes protrusions 72 protruding toward the corresponding one of the side surfaces of battery 14 on a surface of first portion 50 close to battery stack 2. In the present exemplary embodiment, protrusions 72 in a strip shape long in arrangement direction Z are arranged at predetermined intervals in stacking direction X and arrangement direction Z in a matrix. Each protrusion 72 is in contact with the corresponding one of the side surfaces of each battery 14 in a state where side separator 10 is assembled to battery stack 2. Each protrusion 72 presses the corresponding one of the side surfaces of battery 14 when battery 14 expands. This enables gap G between each battery 14 and first portion 50 to be more reliably maintained.

Second portion 52 of side separator 10 is provided with positioning portion 74 for cooling plate 6. Positioning portion 74 includes first wall portion 76 and a pair of second wall portions 78. First wall portion 76 and the pair of second wall portions 78 project from a surface of second portion 52, facing battery stack 2, toward battery stack 2. First wall portion 76 is located closer to battery stack 2 than first portion 50 is in direction Y, and extends in stacking direction X. The pair of second wall portions 78 extend in direction Y from respective opposite ends of first wall portion 76 in stacking direction X.

In a state where the pair of side separators 10 are assembled to a stack of battery stack 2, heat conductive layer 8, and cooling plate 6, end portions of cooling plate 6 in direction Y are fitted to respective positioning portions 74. Cooling plate 6 is positioned in direction Y by coming into contact with respective first wall portions 76, and is positioned in stacking direction X by coming into contact with respective pairs of second wall portions 78. Each first wall portion 76 has a leading end in contact with heat conductive layer 8. This prevents heat conductive layer 8 from being displaced.

Side separator 10 includes drainage channel 80 extending in stacking direction X at an end portion of each first portion 50 close to the bottom surface of battery 14 (hereinafter, referred to as a bottom of each first portion 50). Drainage channel 80 is defined by first portion 50, second portion 52, and first wall portion 76. That is, second portion 52 constitutes a bottom surface of drainage channel 80, and first portion 50 and first wall portion 76 constitute respective side surfaces of drainage channel 80. The bottom surface of drainage channel 80 inclines downward from first portion 50 toward first wall portion 76. This enables water W flowing down through gap G to be guided to drainage channel 80.

Drainage channel 80 has opposite ends in stacking direction X, at which a pair of respective flow path walls 82 are provided outside the pair of corresponding second wall portions 78 in stacking direction X, the flow path walls extending parallel to corresponding second wall portions 78. Thus, the opposite ends of drainage channel 80 in stacking direction X are connected to respective terminal paths 84 extending in direction Y, which are each defined by second wall portion 78, second portion 52, and flow path wall 82. Terminal path 84 can also be regarded as a part of drainage channel 80.

Water W having flowed down from above the top surface of each battery 14 through gap G flows in drainage channel 80 in stacking direction X. Then, water W flows into terminal path 84 at any one of the ends of drainage channel 80 in stacking direction X, and is discharged from terminal path 84 to the outside of battery module 1. This enables water W to be quickly removed from battery module 1. Thus, a short circuit among battery 14, restraining member 12, and cooling plate 6 can be further prevented.

As described above, battery module 1 according to the present exemplary embodiment includes battery stack 2 in which a plurality of batteries 14 each having a top surface provided with output terminals 22 are stacked, restraining member 12 that has flat portion 54 extending along side surfaces of the plurality of batteries 14 in stacking direction X of batteries 14 and restrains the plurality of batteries 14, and side separator 10 that has first portion 50 interposed between each battery 14 and flat portion 54, and insulates each battery 14 from flat portion 54. Then, each battery 14 and first portion 50 of side separator 10 are disposed with gap G having a size for suppressing movement of water W due to the capillarity.

This enables preventing a conductive path through water W from being formed between the top surface of battery 14, and the bottom of restraining member 12 or cooling plate 6. Thus, a short circuit between battery 14 and other members due to water W can be prevented, so that reliability of battery module 1 can be improved.

Side separator 10 includes protrusions 72 protruding toward the corresponding one of the side surfaces of battery 14 on the surface of first portion 50 close to battery stack 2. This enables gap G between battery 14 and first portion 50 to be more reliably maintained. Thus, reliability of battery module 1 can be further improved.

Side separator 10 includes drainage channel 80 extending in stacking direction X at the bottom of first portion 50. This enables water W in battery module 1 to be quickly discharged to the outside of battery module 1. Thus, a short circuit between battery 14 and other members due to water W can be further prevented, so that reliability of battery module 1 can be further improved.

Second Exemplary Embodiment

Figure 4:
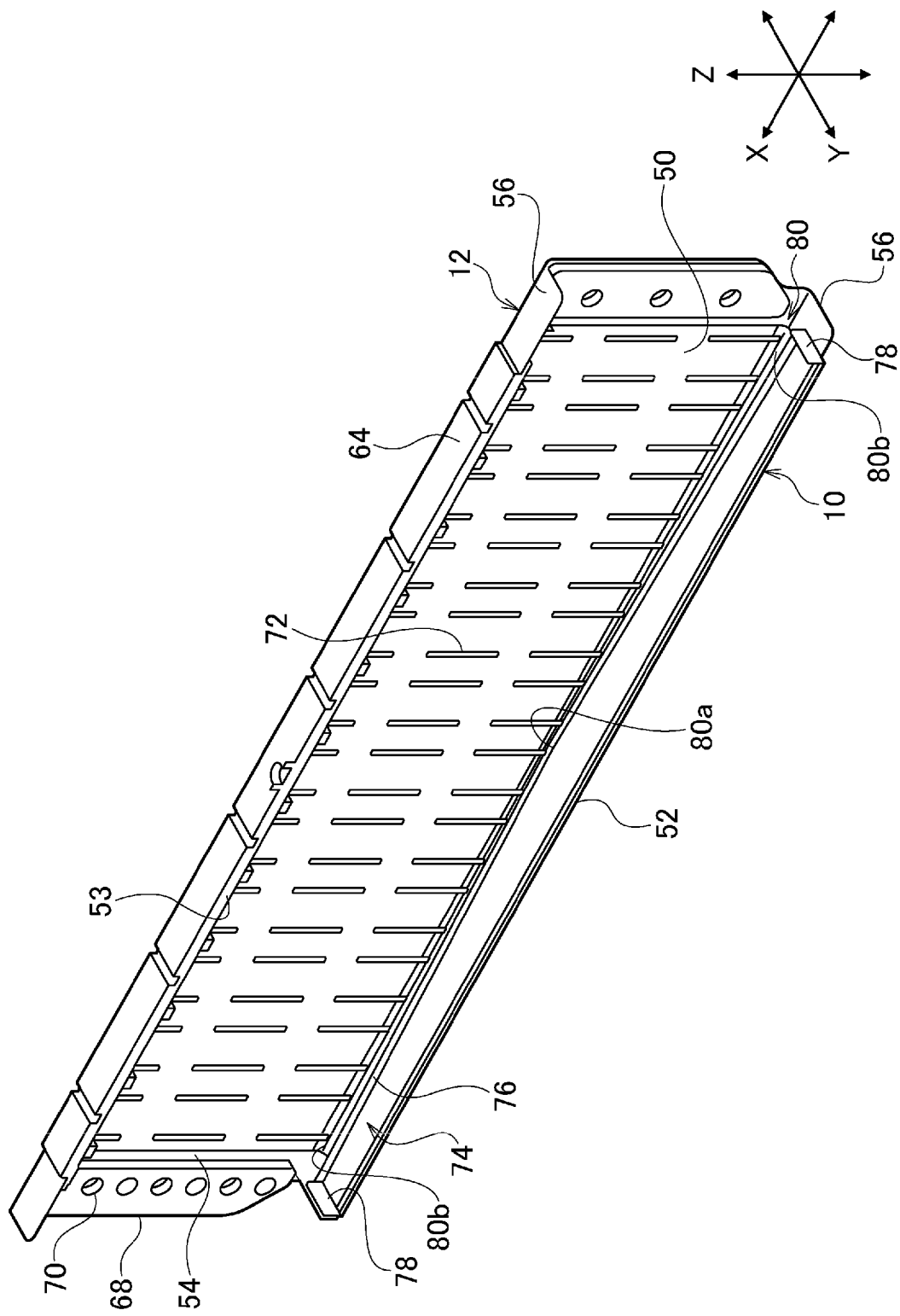
FIG. 4 is a perspective view of a side separator and a restraining member provided in a battery module according to a second exemplary embodiment.
Figure 5:
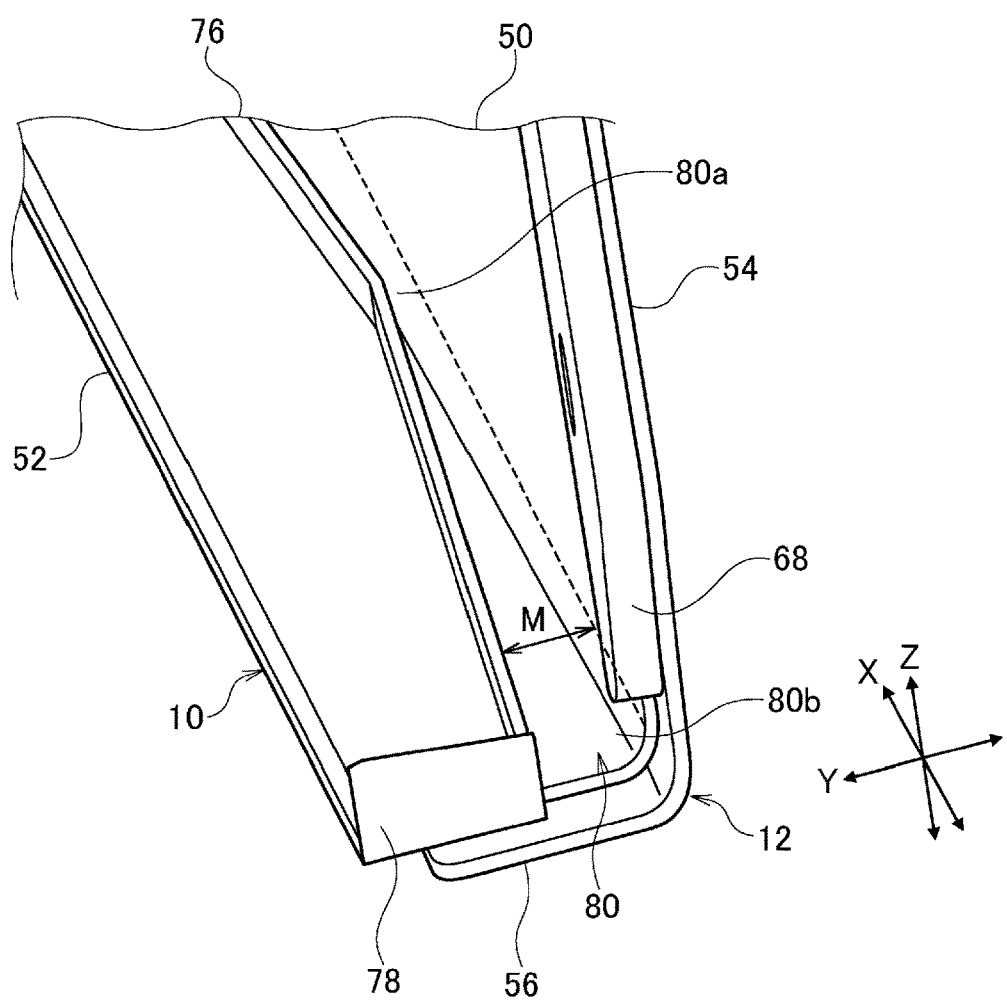
FIG. 5(A) is a perspective view illustrating bottoms of the side separator and the restraining member, in an enlarged manner.
FIG. 5(B) is a sectional view illustrating the bottom of the side separator in an enlarged manner.
Figure 5:
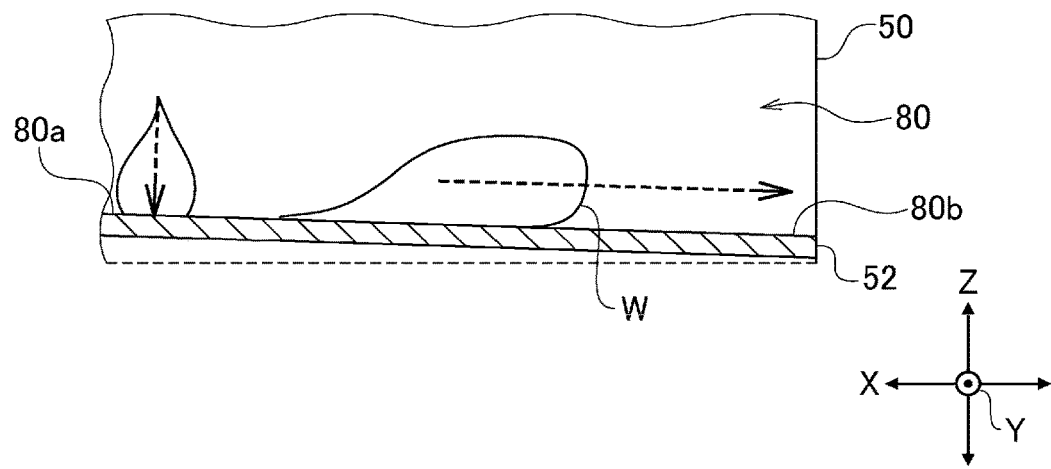

A battery module according to a second exemplary embodiment has a configuration common to that of the first exemplary embodiment except for a shape of a drainage channel. Hereinafter, the battery module according to the present exemplary embodiment will be mainly described with a configuration different from that of the first exemplary embodiment, and the common configuration will be briefly described or eliminated. FIG. 4 is a perspective view of a side separator and a restraining member provided in a battery module according to the second exemplary embodiment. FIG. 5(A) is a perspective view illustrating bottoms of the side separator and the restraining member, in an enlarged manner. FIG. 5(B) is a sectional view illustrating the bottom of the side separator in an enlarged manner.

Battery module 1 of the present exemplary embodiment includes battery stack 2, restraining member 12, and side separator 10. Battery stack 2 has a structure in which a plurality of batteries 14 each having a top surface provided with output terminals 22 are stacked. Restraining member 12 includes flat portion 54 extending along the side surfaces of the plurality of batteries 14 in stacking direction X of batteries 14 and restrains the plurality of batteries 14. Side separator 10 includes first portion 50 interposed between each battery 14 and flat portion 54, and insulates each battery 14 from flat portion 54. Each battery 14 and first portion 50 are disposed with gap G having a size for suppressing movement of water W due to capillarity.

Side separator 10 includes protrusions 72 protruding toward the corresponding one of the side surfaces of battery 14 on a surface of first portion 50 close to battery stack 2. In the present exemplary embodiment, protrusions 72 in a strip shape long in arrangement direction Z are arranged at predetermined intervals in stacking direction X and arrangement direction Z in a matrix. Second portion 52 of side separator 10 is provided with positioning portion 74 for cooling plate 6. Positioning portion 74 includes first wall portion 76 and a pair of second wall portions 78.

Side separator 10 includes drainage channel 80 extending in stacking direction X of batteries 14 at a bottom of first portion 50. Drainage channel 80 is defined by first portion 50, second portion 52, and first wall portion 76. Drainage channel 80 of the present exemplary embodiment inclines from central portion 80a in stacking direction X toward end portions 80b on opposite sides with a height gradually decreasing. Central portion 80a does not necessarily completely coincide with the center point of drainage channel 80 in stacking direction X, and may be deviated in stacking direction X. When a bottom surface of drainage channel 80 is lowered stepwise or continuously from central portion 80a to end portions 80b, water W in drainage channel 80 can be guided to an outlet of drainage channel 80. This enables water W in battery module 1 to be discharged to the outside of battery module 1 more quickly. Thus, reliability of battery module 1 can be further improved.

Drainage channel 80 has a shape in which flow path width M gradually widens from upstream to downstream. Drainage channel 80 of the present exemplary embodiment has central portion 80a located higher than end portions 80b. Thus, central portion 80a is upstream and end portion 80b is downstream. Thus, flow path width M of drainage channel 80 is the narrowest in central portion 80a and gradually widens toward end portions 80b. When flow path width M of drainage channel 80 is gradually or continuously widened from upstream to downstream, water W in drainage channel 80 can be allowed to easily flow toward the outlet of drainage channel 80. This enables water W in battery module 1 to be discharged to the outside of battery module 1 more quickly. Thus, reliability of battery module 1 can be further improved.

Drainage channel 80 may have a shape inclined with a height gradually decreasing from one end toward the other end in stacking direction X. This enables water W in drainage channel 80 to be discharged only from the other end. That is, a discharge position of water W can be controlled. As a result, drainage can be designed in accordance with a fixed position of battery module 1, so that a degree of freedom to install battery module 1 can be increased.

Third Exemplary Embodiment

Figure 6:
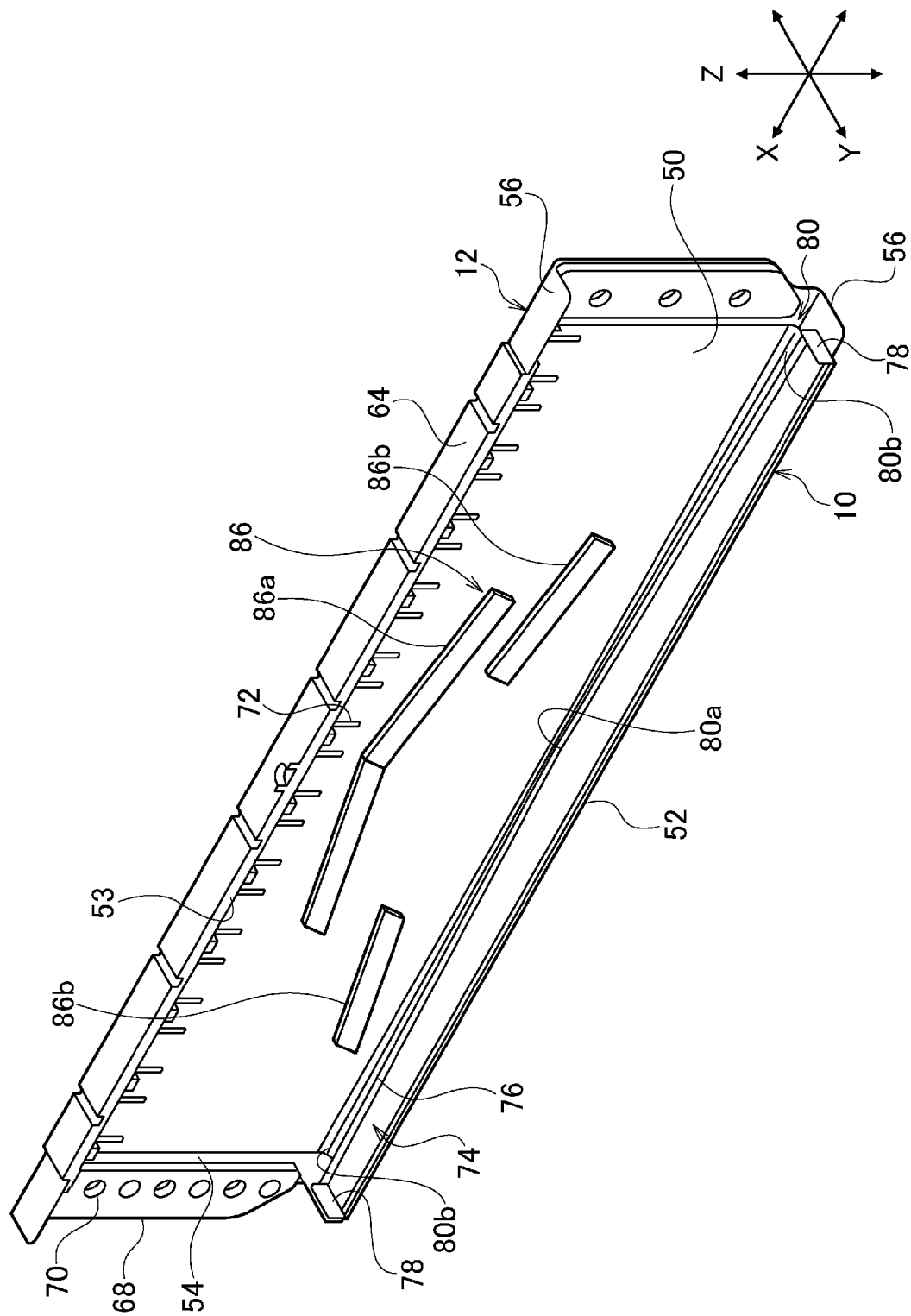
FIG. 6 is a perspective view of a side separator and a restraining member provided in a battery module according to a third exemplary embodiment.

A battery module according to a third exemplary embodiment has a configuration common to that of the second exemplary embodiment except for a shape of a protrusion. Hereinafter, the battery module according to the present exemplary embodiment will be mainly described with a configuration different from that of the first or second exemplary embodiment, and the common configuration will be briefly described or eliminated. FIG. 6 is a perspective view of a side separator and a restraining member provided in the battery module according to the third exemplary embodiment.

Battery module 1 of the present exemplary embodiment includes battery stack 2, restraining member 12, and side separator 10. Battery stack 2 has a structure in which a plurality of batteries 14 each having a top surface provided with output terminals 22 are stacked. Restraining member 12 includes flat portion 54 extending along the side surfaces of the plurality of batteries 14 in stacking direction X of batteries 14 and restrains the plurality of batteries 14. Side separator 10 includes first portion 50 interposed between each battery 14 and flat portion 54, and insulates each battery 14 from flat portion 54. Each battery 14 and first portion 50 are disposed with gap G having a size for suppressing movement of water W due to capillarity.

Second portion 52 of side separator 10 is provided with positioning portion 74 for cooling plate 6. Positioning portion 74 includes first wall portion 76 and a pair of second wall portions 78. Side separator 10 includes drainage channel 80 extending in stacking direction X of batteries 14 at a bottom of first portion 50. Drainage channel 80 is defined by first portion 50, second portion 52, and first wall portion 76. Drainage channel 80 of the present exemplary embodiment inclines from central portion 80a in stacking direction X toward end portions 80b on opposite sides with a height gradually decreasing. Drainage channel 80 has a shape in which flow path width M gradually widens from upstream to downstream. This enables water W in battery module 1 to be discharged to the outside of battery module 1 more quickly. Thus, reliability of battery module 1 can be further improved.

Side separator 10 includes protrusions 72 and protrusions 86, protruding toward the corresponding one of the side surfaces of battery 14, on a surface of first portion 50 close to battery stack 2. In the present exemplary embodiment, protrusions 72, which are each in a strip shape long in arrangement direction Z, are arranged at predetermined intervals in stacking direction X on an upper end side of first portion 50.

First portion 50 is provided in its central portion in arrangement direction Z with protrusions 86 long in stacking direction X. More specifically, protrusion 86a in a wedge shape sharpening upward is disposed at the center of first portion 50 not only in arrangement direction Z but also in stacking direction X. Protrusion 86a in a wedge shape has a wedge tip located in a central portion of first portion 50 in stacking direction X. Additionally, outer protrusion 86b is disposed closer to an end of first portion 50 in stacking direction X than protrusion 86a in a wedge shape is and below protrusion 86a in arrangement direction Z. Outer protrusion 86b inclines downward from its side close to the center of first portion 50 in stacking direction X toward the end of first portion 50. Outer protrusion 86b is disposed such that a part thereof overlaps protrusion 86a in a wedge shape in arrangement direction Z.

Protrusions 86 guide water W flowing down from above the top surface of battery 14 through gap G between battery 14 and first portion 50 from a center side of battery module 1 toward an end thereof. Thus, water W is guided to approach an outlet of water W in battery module 1 even before reaching drainage channel 80. This enables water W in battery module 1 to be discharged to the outside of battery module 1 more quickly. Thus, reliability of battery module 1 can be further improved.

Protrusions 86 may extend horizontally. Only protrusion 86a in a wedge shape may be disposed, and outer protrusion 86b may be eliminated. In this case, protrusion 86a in a wedge shape may be extended in length in stacking direction X to extend an induction distance of water W in stacking direction X.

The exemplary embodiments of the present invention have been described in detail above. The above-described exemplary embodiments each merely show a specific example in carrying out the present invention. The contents of the exemplary embodiments do not limit the technical scope of the present invention, and many design changes such as modification, addition, and deletion of components can be made without departing from a range of the idea of the invention defined in the scope of claims. An additional exemplary embodiment with design change added has effects of an exemplary embodiment and a modification that are combined. Although in the above-described exemplary embodiments, the contents that can be changed in design are emphasized by adding notations such as "of the present exemplary embodiment" and "in the present exemplary embodiment", design change is allowed even when there is not such a notation. Any combination of components included in each exemplary embodiment is also valid as an aspect of the present invention. Hatching attached to a section in a drawing does not limit material of the object to which the hatching is attached.

A number of batteries 14 provided in battery module 1 is not particularly limited. Fastening structure between end plate 4 and restraining member 12 is not particularly limited. Battery 14 may have a cylindrical shape or the like. Side separator 10 may be formed of a plurality of components divided.

REFERENCE MARKS IN THE DRAWINGS 1 battery module
2 battery stack
10 side separator
12 restraining member
14 battery
22 output terminal
50 first portion
54 flat portion
72 protrusion
80 drainage channel
80a central portion
80b end
86 protrusion

The invention claimed is:

1. A battery module comprising:
a battery stack having a plurality of batteries stacked, the plurality of batteries each having a top surface provided with an output terminal;
a restraining member that has a flat portion extending along side surfaces of the plurality of batteries in a stacking direction of the plurality of batteries and restrains the plurality of batteries; and
a side separator that has a first portion interposed between each of the plurality of batteries and the flat portion and insulates the plurality of batteries from the flat portion,
the each of the plurality of batteries being disposed with a gap from the first portion,
the side separator includes a protrusion protruding toward the side surface of the plurality of batteries on a surface of the first portion close to the battery stack, and
each battery has a pair of the output terminals on the top surface, and the battery stack and the protrusion overlap in an arrangement direction in which the pair of output terminals are arranged.

2. The battery module according to claim 1, wherein the plurality of batteries each has a bottom surface opposite the top surface, and
the side separator includes a drainage channel extending in the stacking direction in an end portion of the first portion, close to the bottom surface, the drainage channel defined by an inner surface of the side separator facing the bottom surface of the plurality of batteries.

3. The battery module according to claim 2, wherein the drainage channel inclines with a height decreasing from a central portion in the stacking direction toward opposite ends.

4. The battery module according to claim 2, wherein the drainage channel inclines with a height decreasing from one end toward another end in the stacking direction.

5. The battery module according to claim 2, wherein the drainage channel has a flow path width that widens from upstream to downstream.

6. A battery module comprising:
a battery stack having a plurality of batteries stacked in a stacking direction, the plurality of batteries each having a top surface provided with an output terminal, a bottom surface opposite the top surface, and a side surface connecting the top surface and the bottom surface and extending along the stacking direction;
a restraining member that has a flat portion extending along side surfaces of the plurality of batteries in a stacking direction of the plurality of batteries and restrains the plurality of batteries; and
a side separator that has a first portion interposed between each of the plurality of batteries and the flat portion and insulates the plurality of batteries from the flat portion,
the each of the plurality of batteries being disposed with a gap from the first portion, wherein a dimension of the gap in a direction perpendicular to the side surfaces of the plurality of batteries is configured to be greater than a dimension that causes a capillary movement of water along surfaces defining the gap,
wherein the side separator includes a plurality of protrusions protruding toward the side surface of the plurality of batteries on a surface of the first portion close to the battery stack,
the plurality of protrusions are arranged apart from each other at least in the stacking direction,
the plurality of protrusions are sandwiched between the side surfaces of the plurality of batteries and the first portion of the side separator in the direction perpendicular to the side surfaces of the plurality of batteries, and
each battery has a pair of the output terminals on the top surface, and the battery stack and the plurality of protrusions overlap in an arrangement direction in which the pair of output terminals are arranged.

7. The battery module according to claim 6, wherein the plurality of batteries each has a bottom surface facing the top surface, and
the side separator includes a drainage channel extending in the stacking direction in an end portion of the first portion, close to the bottom surface.

8. The battery module according to claim 7, wherein the drainage channel inclines with a height decreasing from a central portion in the stacking direction toward opposite ends.

9. The battery module according to claim 7, wherein the drainage channel inclines with a height decreasing from one end toward another end in the stacking direction.

10. The battery module according to claim 7, wherein the drainage channel has a flow path width that widens from upstream to downstream.

11. A battery module comprising:
a battery stack having a plurality of batteries stacked, the plurality of batteries each having a top surface provided with an output terminal;
a restraining member that has a flat portion extending along side surfaces of the plurality of batteries in a stacking direction of the plurality of batteries and restrains the plurality of batteries; and
a side separator that has a first portion interposed between each of the plurality of batteries and the flat portion and insulates the plurality of batteries from the flat portion,
the each of the plurality of batteries being disposed with a gap from the first portion,
wherein the side separator further includes:
a second portion extending from a bottom end of the first portion and facing a bottom surface of the plurality of batteries, and
a wall portion extending upward from the second portion toward the bottom surface of the plurality of batteries, the wall portion disposed opposite the first portion in a horizontal direction,
the first portion, the second portion, and the wall portion extend across an entire length of the battery stack in the stacking direction so as to together define a drainage channel between the side separator and the plurality of batteries,
the side separator includes a protrusion protruding toward the side surface of the plurality of batteries on a surface of the first portion close to the battery stack, and
each battery has a pair of the output terminals on the top surface, and the battery stack and the protrusion overlap in an arrangement direction in which the pair of output terminals are arranged.

12. The battery module according to claim 1,
wherein the plurality of batteries each has a bottom surface opposite the top surface,
wherein the battery module has a cooling plate on which the battery stack is placed,
wherein the side separator includes a second portion projecting from a bottom end of the first portion toward the battery stack and facing the bottom surface of the plurality of batteries,
wherein the second portion includes a positioning portion for the cooling plate, the positioning portion including a first wall portion and a pair of second wall portions,
wherein the first wall portion projects from a surface of the second portion, facing the battery stack, toward the battery stack and is located closer to the battery stack than the first portion is in the arrangement direction,
wherein the pair of second wall portions extends in the arrangement direction from respective ends of the first wall portion in the stacking direction, and
wherein end portions of the cooling plate in the arrangement direction are fitted to the positioning portion.

13. The battery module according to claim 1,
wherein the protrusion includes a wedge-shaped protrusion having a wedge shape that is long in the stacking direction and sharpening upward, and
wherein a wedge tip of the wedge-shaped protrusion is located in a central portion of the first portion in the stacking direction.

14. The battery module according to claim 13,
wherein the plurality of batteries each has a bottom surface opposite the top surface,
wherein the protrusion further includes an outer protrusion that inclines downward from a side close to a center toward an end in the stacking direction,
wherein the outer protrusion is disposed closer to the end in the stacking direction than the wedge-shaped protrusion is, and
wherein in a direction in which the top surface and the bottom surface are arranged, the outer protrusion (i) is positioned below the wedge-shaped protrusion, and (ii) has a part thereof overlapping the wedge-shaped protrusion.

* * * * *